United States Patent [19]

Marshall, Jr.

[11] 4,393,456
[45] Jul. 12, 1983

[54] DIGITAL FILTER BANK

[75] Inventor: Thomas G. Marshall, Jr., Princeton, N.J.

[73] Assignee: Bell Telephone Laboratories, Incorporated, Murray Hill, N.J.

[21] Appl. No.: 245,194

[22] Filed: Mar. 19, 1981

[51] Int. Cl.$^3$ ............................................ G06F 15/31
[52] U.S. Cl. ..................................... 364/724; 370/50; 370/70
[58] Field of Search ..................... 364/724; 370/50, 70

[56] References Cited

U.S. PATENT DOCUMENTS

| | | | |
|---|---|---|---|
| 3,891,803 | 6/1975 | Daguet et al. | 179/15 FS |
| 3,971,922 | 7/1976 | Bellanger et al. | 364/724 |
| 4,237,551 | 12/1980 | Narasimha | 370/50 |

OTHER PUBLICATIONS

Fumio Takahata et al., "Development of TDM/FDM Transmultiplexer", IEEE, National Telecommunications Conference, 1977, L.A., Ca.
M. G. Bellanger et al., "TDM-FDM Transmultiplexer: Digital Polyphase and FFT", *IEEE Trans. On Comm.*, Com-22, No. 9, 9-1974, pp. 1199-1205.
G. Bonnerot et al., "Digital Processing Techniques in the 60 Channel Transmultiplexer", *IEEE Trans. On Comm.*, Com-26, No. 5, 5-1978, pp. 698-706.
S. L. Freeny et al., "Design of Digital Filters for an All Digital FDM-TDM Translator", *IEEE Tran. On Cir. Theory*, CT-18, No. 6, 11-1971, pp. 702-711.
S. A. Freeny et al., "Systems Analysis of a TDM-FDM Translator/Digital A-Type Channel Bank", *IEEE Trans. on Comm. Tech.*, COM-19, No. 6, 12-1971, pp. 1050-1059.
M. J. Narasimha et al., "Design of a 24-Channel Transmultiplexer", *IEEE Trans. On Acoustics, Speech, and Sig. Proc.*, ASSP-27, No. 6, 12-1979, pp. 752-762.
J. Makhoul, "A Fast Cosine Transform in One and Two Dimensions", *IEEE Trans. on Acoustics, Speech, and Sig. Proc.*, ASSP-28, No. 1, 2-1980, pp. 27-34.
P. Vary et al., "A Short-Time Spectrum Analyzer With Polyphase-Network and DFT", *Signal Processing 2*, vol. 2, No. 1, 1-1980, pp. 55-65.
P. Vary, "On the Design of Digital Filter Banks Based on a Modified Principle of Polyphase", *AEU Band 33*, Heft 7/8, 1979, pp. 293-300.
M. G. Bellanger et al., "Digital Filtering by Polyphase Network: Application to Sample-Rate Alteration and Filter Banks", *IEEE Trans. on Acoustics, Speech, and Sig. Proc.*, ASSP-24, No. 2, 4-1976, pp. 109-114.

*Primary Examiner*—Jerry Smith
*Attorney, Agent, or Firm*—Volker R. Ulbrich

[57] ABSTRACT

A digital filter bank (10) which has a discrete cosine transform section (12) and a polyphase network section (14) has the polyphase network section configured with a plurality of single input-double output digital filters (16). The filters have one of their outputs (36) independent of their present input signal. This permits a single multiplier-accumulator to use a "memory swapping" procedure to accumulate all the requisite information from a complementary pair of the filters and to perform the necessary operations on it to compute an output value, while clearing the accumulator only once each sampling period.

5 Claims, 3 Drawing Figures

DIGITAL FILTER BANK

TECHNICAL FIELD

The present invention relates generally to digital filter banks and relates more particularly to such filter banks which include a transform section in combination with a polyphase network section of digital filters.

BACKGROUND OF THE INVENTION

Digital filter banks are useful for performing certain selective operations on a broadband signal, such as for spectral analysis and for telephone communications. In telephone communications, for example, it is frequently necessary to provide signal conversion between a TDM (time-division multiplexed) signal format and an FDM (frequency-division multiplexed) signal format. This can be accomplished in each direction in known ways by a signal translator incorporating a digital filter bank of appropriate design for effecting the conversion.

A digital filter bank can be constructed of a transform section connected to a polyphase network of digital filters. A polyphase network allows all the operations to be done at the input bit rate and only then multiplexed to a higher rate. Both such sections can be provided by one or more appropriately adapted large scale integrated circuits known as "digital signal processors" which each contain on a single chip a large number of memory elements and an arithmetic unit in the form of a multiplier-accumulator for operating on values from the memory elements in a selected mode.

Since each digital signal processor generally has only a single multiplier-accumulator available for operating on the values from the memory, it is important to make efficient use of it. Additionally, it is highly desirable to minimize the number of times that the contents of the accumulator of the multiplier-accumulator must be cleared and transferred to the memory each sampling period, because each such operation tends to introduce round-off noise in the signal.

SUMMARY OF THE INVENTION

The digital filter bank in accordance with the present invention includes a polyphase network of single input, multiple output digital filters which are constructed so that for a given sampling period the value of at least one of the outputs is dependent upon a present input signal to the filter bank, while the value of the other outputs is independent of this present input value. This construction permits a "memory swapping" procedure which makes it possible for the multiplier-accumulator to accumulate all the requisite information from a complementary pair of such filters and to perform the necessary operations on it to compute an output while clearing the accumulator only once each sampling period. As a result, the round-off noise is greatly minimized and highly efficient use is made of the multiplier-accumulator.

DESCRIPTION OF THE PREFERRED EMBODIMENT

Figure 1:
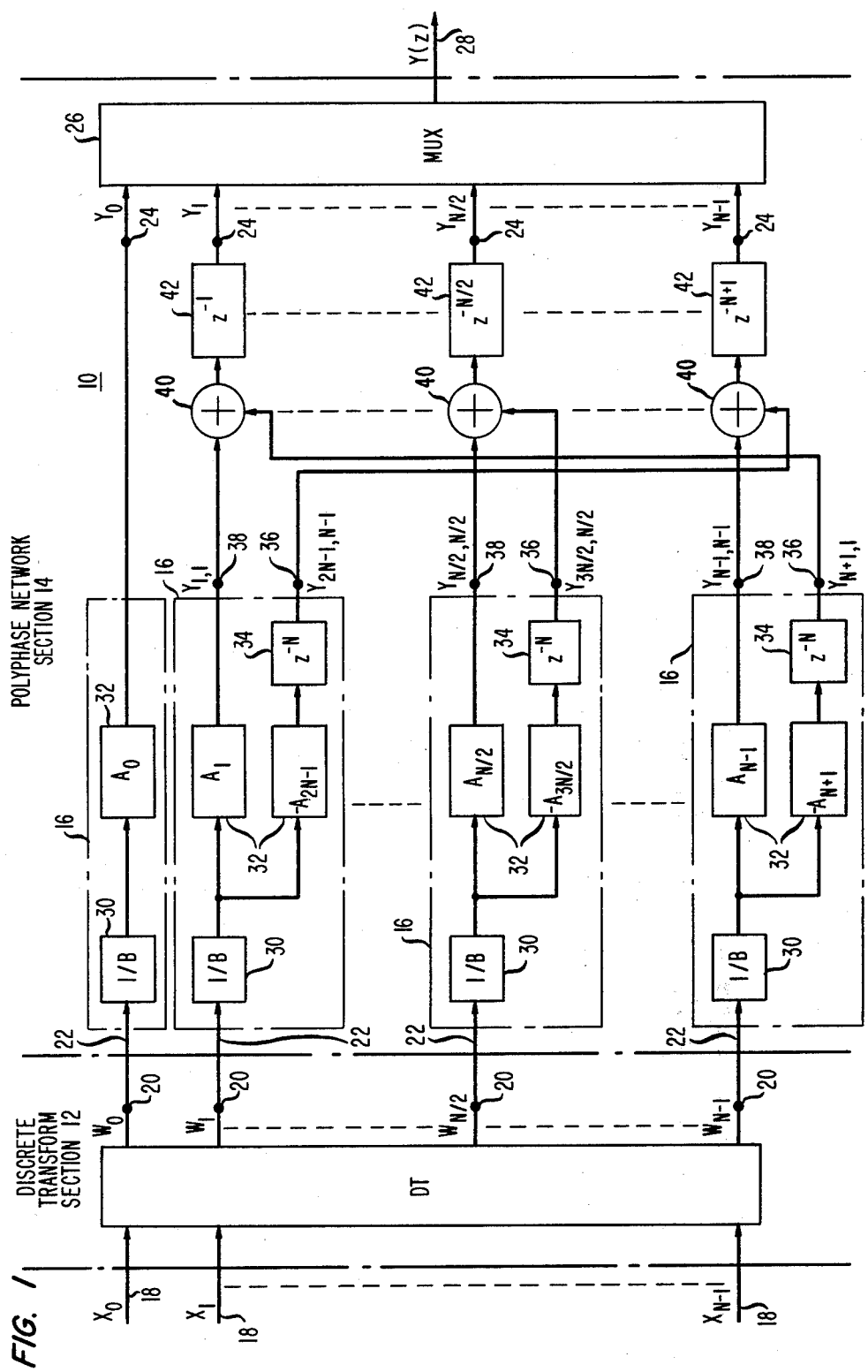
FIG. 1 is a schematic signal flow path block diagram of a digital filter bank in accordance with a preferred embodiment of the present invention, including a polyphase network filter made up of a plurality of SIDO (single input, double output) digital filters.

The schematic signal flow diagram of FIG. 1 shows a digital filter bank 10 in accordance with the present invention which is designed to serve as a 14-channel TDM/FDM signal translator. The diagram of FIG. 1 is configured to represent the various operations of the filter bank 10 as occurring simultaneously and therefore includes a number of signal delay devices. In actual practice these delays are in large part provided in known ways by appropriate time frame ordering of the operations performed on the signal.

The digital filter bank 10 includes a discrete cosine transform section 12 and a polyphase network section 14. The polyphase network section 14 is constructed with 14 digital filters 16 shown enclosed by broken lines. The structure and general mode of operation of the cosine transform section 12 is well known to those of ordinary skill in the art of digital filter transforms and is not discussed in detail here. The general structure and function of the polyphase network section 14 and the nature of its interaction with the cosine transform section 12 is also well known to those of ordinary skill in the art of digital filter bank design and is not discussed in detail here, except as regards features which pertain to the present invention.

The designing of digital filter banks and their description generally involves numerous mathematical relationships which are best expressed in mathematical notation. In the interest of conciseness, such notation is used in the following description of the filter bank 10 and is present in the drawings. The symbols used are ones customarily used in the art of digital filtering, and as such the description is believed to be in a form readily understandable to a person of ordinary skill in the art of digital filtering. Various mathematical expressions which are set out from the text are numbered for reference elsewhere.

The digital filter bank in accordance with the present invention can be effectively implemented by a person of ordinary skill in the art of digital filter banks by appropriately adapting one or more digital signal processors. Such processors are presently in use and may include a memory unit, an arithmetic unit, a control unit, an input-output unit and a machine language storage unit in a single VLSI circuit or may alternately be a combination of a number of separate VLSI circuits interconnected to provide the needed functions.

One device which is suitable for implementing the digital filter bank of the present invention is a DSP (Digital Signal Processor) manufactured by the Western Electric Co., a corporation of New York, U.S.A. and described, for example, in the following:

copending application of J. R. Boddie, R. N. Gadenz and J. S. Thompson, Ser. No. 120,058 filed Feb. 11, 1980 and abandoned on Oct. 29, 1982;

copending application of J. R. Boddie and J. S. Thompson, Ser. No. 120,059 filed Feb. 11, 1980 and abanoned on July 23, 1982; and copending application of S. Walters, Ser. No. 203,794, filed Nov. 3, 1980.

Another suitable device is a Signal Processing Interface NEC μ PD7720, manufactured by the Nippon Electric Co. of Japan and marketed by Microcomputers, Inc., Wellesley, Mass., U.S.A. A suitable combination of devices can be assembled by combining memory and controller circuits with a MAC-16 (TDC 10 10 J) multiplier-accumulator manufactured and marketed by the TRW Co. of California, U.S.A. The programming of a particular VLSI digital signal processor circuit configuration can be readily performed by a person of ordinary skill in the art of digital signal processor implementations.

The following items, some of which are referred to in the discussion below, are cited as examples of publications describing various aspects of digital filtering. An understanding of these aspects may be helpful for gaining an understanding of the digital filter bank 10:

U.S. Pat. Nos.:
3,891,803
3,971,922
4,237,551

TECHNICAL PUBLICATIONS

M. G. Bellanger and J. L. Daguet, "TDM-FDM Transmultiplexer: Digital Polyphase and FFT", *IEEE Trans. Comm.*, Vol. COM-22, pp, 1199-1205, September 1974.

G. Bonnerot, M. Coudreuse and M. G. Bellanger, "Digital Processing Techniques in the 60 Channel Transmultiplexer", *IEEE Trans. Comm.*, Vol. COM-26, pp. 698-706, May 1978.

S. L. Freeny, R. B. Kieburtz, K. V. Mina and S. K. Tewksbury, "Design of Digital Filters for an All Digital Frequency Division Multiplex-Time Division Multiplex Translator", *IEEE Trans. Circuit Theory*, Vol. CT-18, pp. 702-711, November 1971.

"Systems Analysis of a TDM-FDM Translator/Digital A-Type Channel Bank", *IEEE Trans. Comm.*, Vol. COM-19, pp. 1950-1959, December 1971.

M. J. Narasimha and A. M. Peterson, "Design of a 24-Channel Transmultiplexer", *IEEE Trans. Acoust., Speech, Signal Processing*, Vol. ASSP-27, pp. 752-761, December 1979.

John Makhoul, "A Fast Cosine Transform in One and Two Dimensions", *IEEE Trans. Acoust., Speech, Signal Processing*, Vol. ASSP-28, pp. 27-34, February 1980.

P. Vary and U. Heute, "A Short-Time Spectrum Analyzer with Polyphase-Network and DFT", *Signal Processing*, Vol. 2, pp. 55-65, January 1980.

P. Vary, "On the Design of Digital Filter Banks Based on A Modified Principle of Polyphase", *AEU*, Band 33, Heft 7-8, 1979, pp. 293-300.

While the polyphase network section 14 of the filter bank 10 is often designed with 14 or 64 digital filters 16, the following discussion of the filter structure and the interconnections of the polyphase network section 14 will relate to a more general case of a design suited for any desired number N of digital filters 16, where N is an even integer. In this regard, it should be recognized that while the filter bank 10 includes a discrete cosine transform section 12, other types of fast Fourier transform sections can also be used and may even be preferable for a different number of input channels. The labeling of the inputs 18 is from $X_0$ to $X_{N-1}$, instead of from $X_1$ to $X_N$, as a convenience in making calculations for the design parameters of the filter bank 10.

The schematic diagram of FIG. 1 shows the signal flow of the filter bank 10. The signals in their various states in the filter bank 10 are represented throughout by the notations X, W, and Y, as abbreviations for their respective z-transform notations, which would be $X(z^N)$, $W(z^N)$, and $Y(z^N)$. The signals themselves are sequences of values, such as the input sequences usually obtained by sampling analog signals at a given sampling rate, the inverse of this sampling rate being a sampling period.

A number N of input signal channels 18 supply N input signals $X_0$ to $X_{N-1}$ to the discrete transform section 12, which here performs a discrete cosine transform. Typically, N=14, so that there would be fourteen such input signals X in the form of sequences of values coming from a demultiplexer (not shown) receiving a single TDM input signal. In this instance, the first $X_0$ input channel 18 and the last $X_{N-1}$ input channel 18 function as guard bands and have no values which may be regarded as zero values for all sampling periods. The even-number channel signals are often voice signals sampled at an 8 kHz rate, whereas the odd-numbered channels are often similarly sampled voice signals modified by multiplying every other sample by minus one to facilitate the filtering or selecting of the lower sideband of all signals by the filter bank. This is described, for example, in the Freeny et al publication cited above.

The output of the discrete transform section 12 is a set of N transformed signals 20 labeled from $W_0$ to $W_{N-1}$, which then pass to the polyphase network section 14 having N input branches 22. The term "transformed signals" refers to signals derived from a discrete transform and does not refer to the use of z-transform notation, which applies to all signals. Each input branch 22 is associated with a corresponding one of the transformed signals 20, and will therefore be individually identified herein by reference to the W transformed signal 20 associated with it. The transformed signals 20 are processed by the SIDO's 16 to eventually result in a corresponding number of signals 24, labeled $Y_0$ to $Y_{N-1}$, which pass to a multiplexer 26 having a single Y(z) FDM output 28. The notation "$z^N$" as the argument corresponds to a sampling period N·T which is N times that of a signal with the argument "z" which has sampling period T. The signals 24, of sampling period N·T, have been delayed from 1 to N−1 periods T by delays 42 and are combined sequentially by multiplexer 26 to give signal Y(z) of sampling period T.

With the exception of the filter 16 of the $W_0$ branch 22, the filters 16 are SIDO (single input, double output) filters with identical 1/B recursive portions 30 and two non-recursive portions 32 labeled A and −A, and also include a delay register 34, labeled $z^{-N}$, which delays one of the output signals by N output periods for a total delay of N·T. Since the $-A_n$ non-recursive functions has a factor of $z^{-N}$ for all $n \geq N$, it is convenient to show this delay explicitly as the $z^{-N}$ delay register 34 in FIG. 1.

In the $W_0$ branch 22, the signal passes through a conventional single input, single output digital filter 16 which includes a recursive portion 30 and a single non-recursive portion 32 leading directly to the multiplexer 26. Each of the SIDO filters 16 of the remaining branches 22 has a single input W, a first output 36, and a second output 38.

It can be seen from FIG. 1 that from the SIDO filters 16 there is a set of first outputs 36 denoted by $Y_{2N-1,N-1}$ to $Y_{N+1,1}$ which are independent of the transformed signals 20 for the present sampling period but dependent on these signals for a previous sampling period. For this notation "Y", as well as for other notations herein which identify a signal or a component associated with two different paths of transformed signals 20, there are provided a pair of subscripts which indicate the nature of the association. There is also a set of second outputs 38 from $Y_{1,1}$ to $Y_{N-1,N-1}$ which are dependent in general on the transformed signals 20 for the present sampling period. Between the non-recursive filter portions $-A$ and the first outputs 36, the signals are delayed by the delay registers 34. The signals $Y_{2N-1,N-1}$ to $Y_{N+1,1}$ from each of the first output 36 of the SIDO filters 16 are accumulated with those of the second output 38 of a complementary one of the SIDO filters 16 by adders 40. The pair of subscripts of the symbol Y of each of the two outputs 36, 38 includes a first one which identifies the input branch 22 of the non-recursive filter portion A, $-A$ from which the signal is coming and a second one which identifies the input branch 22 of the complementary SIDO filter 16 to which it is being sent for output accumulation. This notation therefore describes the network interconnections of the filters 16 without showing each of the actual paths, which would result in needless crowding of detail in FIG. 1. The interconnection of the $W_{N/2}$ input branch 22 SIDO 16 is also shown in particular in FIG. 1 because its SIDO filter 16 is its own complement. The $Y_{3N/2,N/2}$ first output 36 of its SIDO filter 16 is accumulated with its own $Y_{N/2,N/2}$ second output 38, rather than with the second output 38 of one of the other SIDO filters 16. From the adders 40 the signals proceed to delay registers 42, so that they sequentially enter the multiplexer 26 to yield the single FDM output signal at the output 28.

Figure 2:
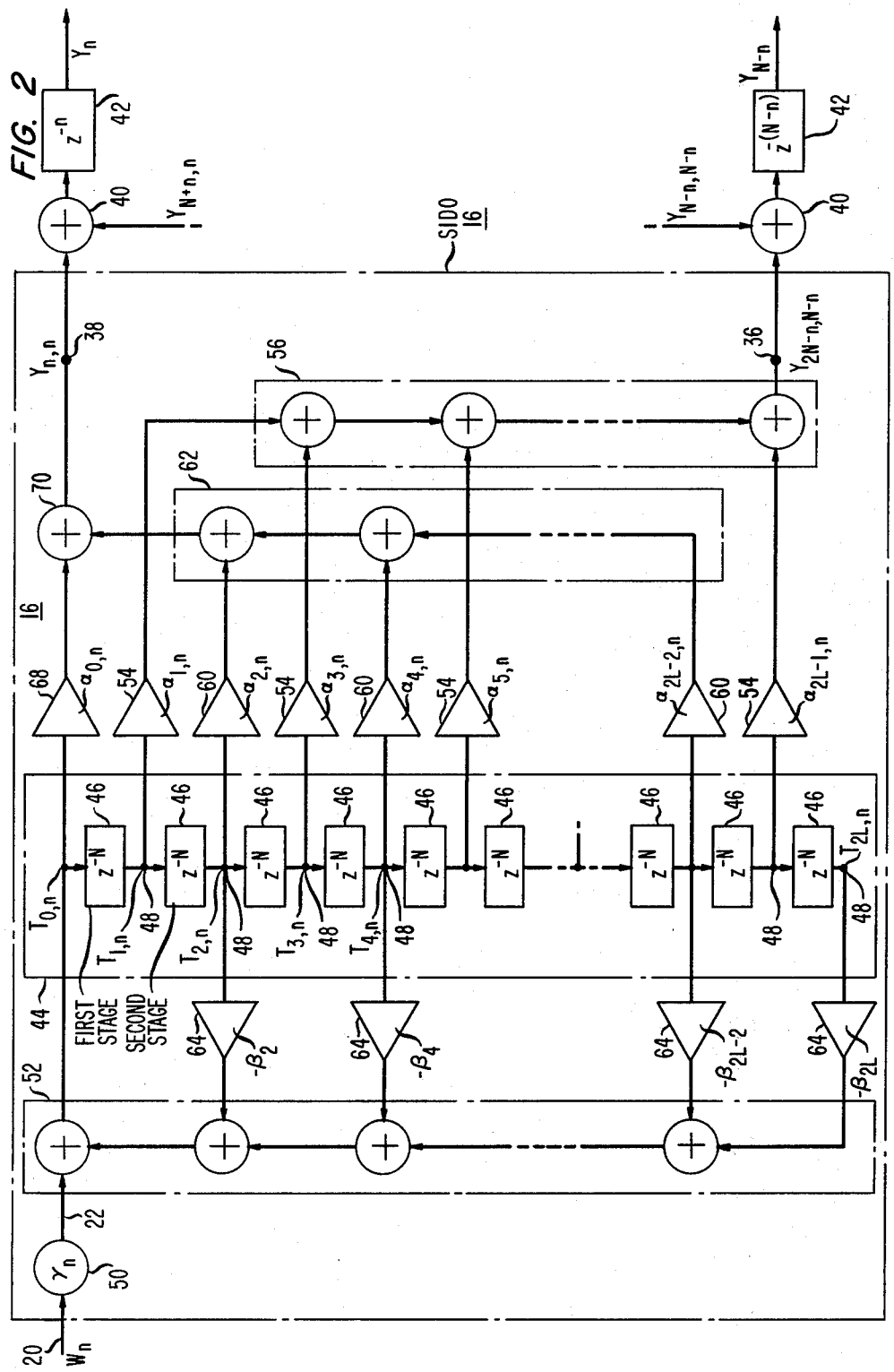
FIG. 2 is a schematic signal flow path block diagram of one of the SIDO digital filters of the polyphase network of FIG. 1.

The operation of the SIDO filters 16 is shown in more detail in the flow path diagram of FIG. 2. Signal flow symbols in FIG. 2 are provided with subscripts which indicate that the filter 16 is for the $n^{th}$ input branch 22, where n is a variable integer ranging from 1 to $N-1$. It can therefore be the SIDO filter 16 for any one of the input branches 22 from the $W_1$ branch 22 to the $W_{N-1}$ branch 22.

The $n^{th}$ SIDO filter 16 has as its input the $W_n$ transformed signal 20. It has a first $Y_{2N-n,N-n}$ output 36 and a second $Y_{n,n}$ output 38. A central feature of the SIDO filter 16 is a shift register 44 (outlined by broken lines) having a set of N stages 46, labeled $z^{-N}$, with an access tap 48 below each stage 46. The $W_n$ transformed signal 20 passes through a multiplier 50 with coefficient $\gamma_n$ and a first one of a first set of adders 52 to become a present input signal $T_{0,n}$ for the shift register 44. From there it enters the first one of the $z^{-N}$ register stages 46 and is transferred to the second and successive stages 46 at the rate of one shift each sampling period.

The taps 48 of the first stage 46 and of every other successive stage 46 are respectively multiplied by a corresponding set of multipliers 54 with coefficients being $\alpha_{1,n}$ to $\alpha_{2L-1,n}$, and accumulated by the second set of adders 56 to yield a signal $Y_{2N-n,N-n}$ for the first output 36. It is noted that the $Y_{2N-n,N-n}$ first output 36 is independent of the present register input signal $T_{0,n}$, and can be computed either before or after $T_{0,n}$ is computed during substantially the entire sampling period. The $Y_{2N-n,N-n}$ first output 36 is, however, dependent in general on the register input signal of a previous sampling period because the coefficients $\alpha_n$ of the multipliers 54 are in general non-zero for making the best use of the filter bank 10. In specific instances, however, certain of the multipliers 54 could have zero coefficients $\alpha_n$, thereby removing the dependence in a technical sense. The independence of $Y_{2N-n,N-n}$ from $T_{0,n}$ allows it to be computed immediately following the computations of $Y_{N-n,N-n}$, so that the two signals can be added with adder 40 leading to signal $Y_{N-n}$; this can be done even if $N-n$ is less than n because of the stated independence from $T_{0,n}$. Therefore, all the signals $Y_n$ can be computed in numerical order even though their summands, $Y_{N+n,n}$, are derived from $N-n$ SIDO's whose indices change in reverse order.

The taps 48 of the $z^{-N}$ second register stage 46 and of every other $z^{-N}$ successive stage 46 are connected through one of a respective set of multipliers 60 from $\alpha_{2,n}$ to $\alpha_{2L-2,n}$ to a set of adders 62. These taps 48 are also connected through another respective set of multipliers 64 from $-\beta_2$ to $-\beta_{2L}$ to the set of adders 52.

The accumulated value from the set of adders 52 is connected so that it contributes to input $T_{0,n}$, thus resulting in a feedback, or recursive path. The signal $T_{0,n}$ does not within its present sampling period depend upon the accumulated values of either set of adders 56 or 62, so that the paths incorporating these adders is feed-forward, or non-recursive. The accumulated value from the set of adders 62 is accumulated with the register input signal $T_{0,n}$ via a multiplier 68 with coefficient $\alpha_{0,n}$ by the adder 70 to generate a sum signal $Y_{n,n}$. It is noted that the signal $Y_{n,n}$ of the second output 38 depends on the present register input signal $T_{0,n}$.

Figure 3:
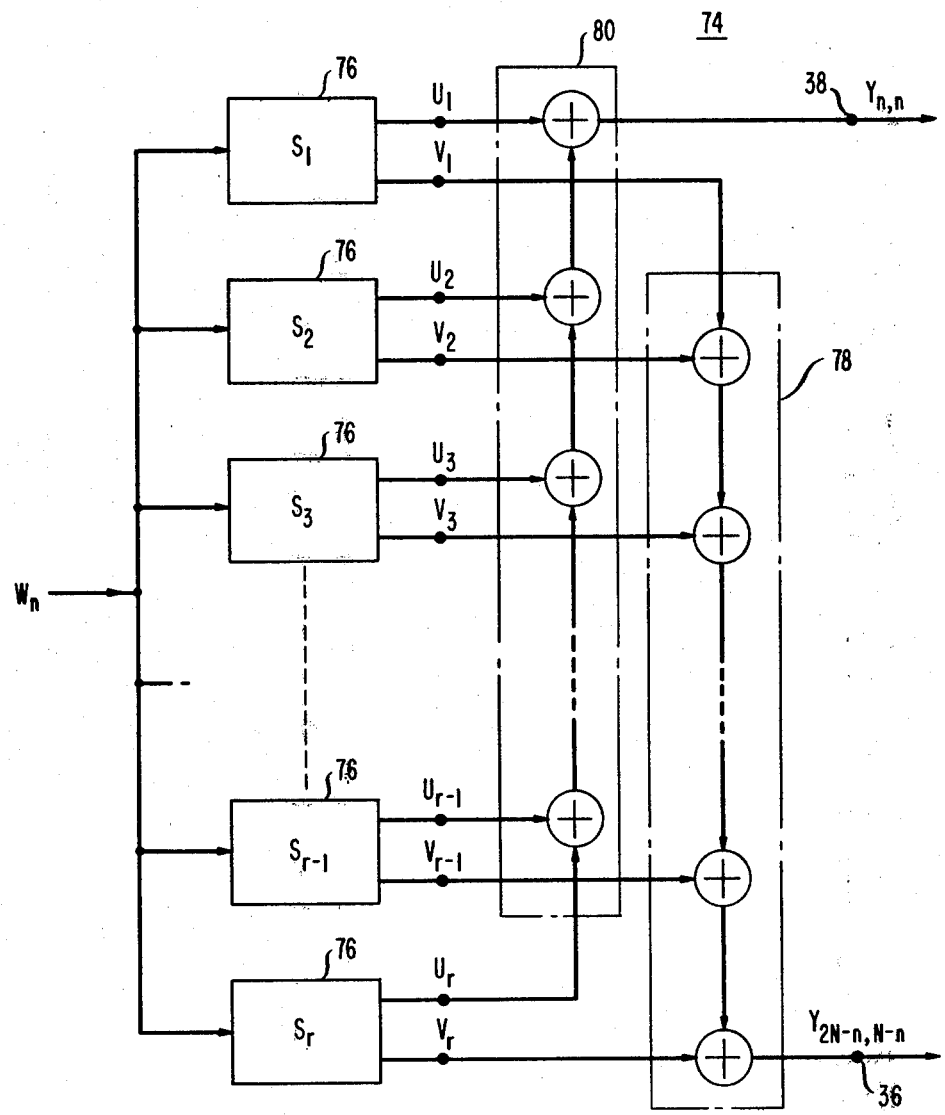
FIG. 3 is a schematic signal flow path schematic block diagram of an alternative structure for the digital filter of FIG. 2 in accordance with another preferred embodiment of the invention.

An alternate form of the SIDO filter 16 of FIG. 2 is the SIDO filter 74 shown in FIG. 3 which can realize the same functional relations between $Y_{n,n}$ and $W_n$ and between $Y_{2N-n,N-n}$ and $W_n$ as that of FIG. 2. The SIDO filter 74 is constructed of a parallel combination of a number r (where r is an integer) of smaller, component SIDO filters 76 from $S_1$ to $S_r$ which each include a shift register with fewer stages than the filter 16 of FIG. 2 for the same functional relationship, typically 4. The sum of the number of stages in FIG. 2 and FIG. 3 is the same for the same functional relationship. It is seen that all the first outputs from $V_1$ to $V_r$ of the parallel component SIDO filters $S_1$ to $S_r$ accumulate via a set of adders 78 to provide a signal $Y_{2N-n,N-n}$ for the first output 36 while all the second outputs $U_1$ to $U_r$ of the parallel component SIDO filters $S_1$ to $S_r$ accumulate via a set of adders 80 to provide a signal $Y_{n,n}$ for the second output 38. The SIDO filter 74 has the advantage that the multiplier coefficients $\alpha$ and $\beta$ present in the functions of the $S_1$ to $S_r$ component SIDOs can be represented with fewer bits than those of the SIDO filter 16 for comparable performance. It is well known in the art of digital filter design that a single-input, single-output filter consisting of a parallel combination of smaller filters, obtained by a well-known partial fraction expansion design procedure, can be constructed using fewer bits for the coefficients than a single-input, single-output filter of the direct form, i.e., having a simple but larger shift register. The SIDO 74 of FIG. 3 employs the same coefficients as would two single-input, single-output filters each designed by the partial fraction expansion procedure to serve the same function, and therefore shares this property.

DIGITAL FILTER BANK FUNCTIONS

The operational relationships of the filter bank 10 will now be discussed. The number N is assumed to be 14, as would commonly be the case. The $x_k(m)$ are signals which are sampled at 8 kHz. They are voice signals for k-even and are $(-1)^m$ times voice signals for k-odd.

The input signals to the filter bank, $x_k(m)$, can be represented in transform notation as $X_k(z^N)$. The complete filter bank which is used in a TDM to FDM translator is described by $$Y(z) = \sum_{k=0}^{N-1} X_k(z^N) H_k(z), \qquad (1)$$

in which, because of the use of guard bands, it is often true that $X_0(z^N)$ and $X_{N-1}(z^N)$ are zero. $H_k(z)$ is the transfer function of the desired filtering operation for channel k of the filter bank. It is derived from the transfer function of a prototype filter having transfer function H(z). The prototype's impulse response is $$[h(r)] = [h_0, h_1, \ldots, h_r, \ldots, h_M, \ldots] \qquad (2)$$

with z transform $$H(z) = h_0 + h_1 z^{-1} + \ldots + h_r z^{-r} + \ldots + h_M z^{-M} + \ldots \qquad (3)$$

The ratio $$M = 112 \text{ kHz}/4 \text{ kHz} = 28 \qquad (4)$$

is the ratio of the sampling rate of the FDM signal to the channel bandwidth. It is convenient to express H(z) in the decimated form $$\begin{aligned}H(z) = &(h_0 + h_M z^{-M} + h_{2M} z^{-2M} + \ldots) + \\ &z^{-1}(h_1 + h_{M+1} z^{-M} + h_{2M+1} z^{-2M} + \ldots) + \\ &z^{-2}(h_2 + h_{M+2} z^{-M} + h_{2M+2} z^{-2M} + \ldots) + \\ &\ldots + z^{-(M-1)}(h_{M-1} + h_{2M-1} z^{-M} + \\ &h_{3M-1} z^{-2M} + \ldots) = P_0(z^M) + \\ &z^{-1} P_1(z^M) + z^{-2} P_2(z^M) + \\ &\ldots + z^{-(M-1)} P_{M-1}(z^M) = \\ &\sum_{n=0}^{M-1} z^{-n} P_n(z^M).\end{aligned} \qquad (5)$$

The filters $P_n(z^M)$ resulting from the decimation are unique to the polyphase approach which is described in further detail in the above-cited publication of Bellanger and Daguet. The translation of H(z) to $H_k(z)$ will be now discussed.

The translation of H(λ), with λ representing the digital frequency expressed in radians/sample and the center frequency of the $k^{th}$ channel by $\lambda_k$, which is given by the expression, $$\lambda_k = (2k+1)\pi/M \qquad (6)$$

is summarized by Table 1.

TABLE 1.

| Lowpass to Bandpass Transformation |
|---|
| $H(\lambda) \to H_k(\lambda) = \frac{1}{2} H(\lambda + \lambda_k) + \frac{1}{2} H(\lambda - \lambda_k)$ |
| $z \to z e^{\pm j\lambda_k}$ |
| $z^M \to -z^M$ since $\lambda_k = \frac{(2k+1)\pi}{M}$ |
| $H(z) \to H_k(z) = \ldots + h_r \left[ \frac{(z e^{+j\lambda_k})^{-r} + (z e^{-j\lambda_k})^{-r}}{2} \right] +$ |
| $\ldots = \ldots + h_r z^{-r} \cos\lambda_k r + \ldots$ |

TABLE 1.-continued

| Lowpass to Bandpass Transformation |
|---|
| $H(z) \to H_k(z) = \sum_{n=0}^{M-1} (\cos\lambda_k n) z^{-n} P_n(-z^M)$ |

It is important to observe that the polyphase network filters, $P_n(-z^M)$, of the translated filter, $H_k(z)$, are independent of k since $z^M$ translates to $-z^M$ independent of k. The expression for $H_k(z)$ given in Table 1 can be introduced into Equation (1), and, in view of the independence of the $P_n(-z^M)$ with respect to the index k, the order of summation can be reversed to yield, $$Y(z) = \sum_{n=0}^{M-1} z^{-n} P_n(-z^M) W_n(z^N), \qquad (7)$$

in which $$W_n(z^N) = \sum_{k=0}^{N-1} \cos\lambda_k n \, X_k(z^N), \qquad (8)$$

or, reverting to the time domain, $$w_n(m) = \sum_{k=0}^{N-1} \cos\lambda_k n \, x_k(m). \qquad (9)$$

Equation (9) will be referred to as the discrete cosine transform (DCT), although a constant often included in other contexts is not present here.

The change in order of summation in going from (1) to (7) changes the structure radically from that employing 12 separate high rate bandpass filters to that of a discrete cosine transform and a polyphase network of 28 low rate polyphase network filters, shown in FIG. 1. All filtering and discrete transform operations in FIG. 1 occur at the input rate, typically of 8 kHz, so one discrete cosine transform and 28 filtering operations, each with the new input $w_n(m)$, need to be performed at this rate. The computation rate is reduced by about a factor of 8 by using the structure of FIG. 1 as opposed to the use of separate filters, $H_k(z)$, shown in Equation (1).

The efficient solution of the DCT equations of Eq. (9) was considered in the above-cited Narasimha and Peterson publication. The solution methods for the DCT are adequately described in the published literature and will not be described further here.

THE POLYPHASE NETWORK SECTION 14 STRUCTURE AND ALGORITHM

A. A Single-Input-Double-Output Filter Structure

The realization of a TDM/FDM translator with 28 polyphase network filters, $P_n(-z^M)$, as in the prior art and as suggested by Equation (7), requires about one-third more filtering operations than necessary. The reason for these extra operations is that each filter resulting from the polyphase network breakdown procedure is of the form $$P_n(-z^M) = A_n(-z^M)/B(-z^M) \qquad (10)$$

in which the denominator is the same for all paths, as illustrated in FIG. 1. In view of this, it is seen that the recursive filtering operations defined by $B(-z^M)$ need only be done on $W_n(z^N)$ for $0 \leq n \leq 13$, as shown in FIG. 1. In order to avoid the use of extra memory, the memory required for the recursive operations upon the $W_n$ can be combined with that for the operations of $A_n$ and $A_{28-n}$ shown in FIG. 1 for $1 \leq n \leq 13$. The single-input-double-output (SIDO) filter in FIG. 2 results. The degrees of the numerator and denominator of the prototype filter have both been assumed to be L, and would be expected to be 8 or 9 for this application.

Double-input-double-output structures were disclosed in the above-cited publication by Bonnerot et al, and achieve similar reductions in memory requirements to those achieved by the SIDO 16 of FIG. 2. In the Bonnerot et al publication it is assumed that the numerator of H(z) has the symmetry of a linear-phase FIR filter which permits a reduction in the required number of multiplications. It is for this additional reason that the structures there described have two inputs as well as two outputs. This assumption and a similar structure for FIR filters was employed in the Narasimha and Peterson publication.

For the filter bank 10, the linear-phase assumption has not been made, since the resulting structure does not reduce the number of additions, as would be desirable when a digital signal processor with an arithmetic unit consisting of only a multiplier-accumulator is employed, and the linear-phase restriction increases the order of the non-recursive filters. It is seen here, that economies in memory and recursive operations can be obtained even though the linear-phase assumption is not made. It will also be seen that the SIDO filter 16 lends itself to an efficient realization with the minimal number of round off noise sources.

B. Memory Swapping Algorithm for SIDO Filter

The SIDO filter 16 structure appears, at first glance, to require the use of three separate accumulators for accumulation of the recursive products and the two sets of non-recursive products. This would be the case if one starts at the last tap 48 of the shift register 44 and proceeds to the first, forming and accumulating all products and shifting the register's contents, in order, in the conventional manner. However, the sets of alternate locations of the register 44 form two groups whose functions may be swapped each sampling period. Only one of the groups need be shifted, thereby eliminating half of the shifting, as shown in the following algorithm. It is assumed in this algorithm that $\alpha_{0,n}$ is a power of 2, so that multiplication by this constant can be done by a scaling operation. This assumption is a convenience, but not a necessity, and a modified algorithm which has one more multiplication will accommodate values of $\alpha_{0,n}$ which are not powers of 2.

ALGORITHM: MEMORY SWAPPING

I. For each sample m
  A. Compute $Y_0$ for the conventional single-input-single-output filter.
  B. For each value of n in the range $1 \leq n \leq 13$,
    1. accumulate $-T_{2i,n}\beta_{2i}$ for i=L to 1 while shifting $T_{2i,n}$ to register $2i+2$ (except that $T_{2L,n}$ can be discarded rather than shifted),
    2. accumulate $\gamma_n W_n$ with the former accumulator contents to obtain $T_{0,n}$, shift $T_{0,n}$ to register (2,n) and scale accumulator by $\alpha_{0,n}$,
    3. accumulate $\alpha_{2i,n}T_{2i+2,n}$ for i=(L−1) to 1 with the former accumulator contents, $\alpha_{0,n}T_{0,n}$, to obtain $Y_{n,n}$ and, for the complementary SIDO N−n,
    4. accumulate $\alpha_{2i-1,N-n}T_{2i-1,N-n}$ for i=L to 1 with the former accumulative contents, $Y_{n,n}$, to obtain $Y_n$.
  C. Swap the functions of the groups of even and odd register memory locations for all filters, i.e., pointers to $T_{2i,n}$ and $T_{2i-1,n}$ are interchanged so that the odd numbered register stages in this sampling period will serve the role of even numbered stages in the next sampling period.

It can be seen in the above algorithm that each $Y_n$ is computed with no need for clearing the accumulator in the computation of $Y_n$ during sampling period m, except at the outset. Since the accumulator width, i.e., the number of bits, in most designs exceeds the width of the product, only two significant round-off noise sources then occur, that due to the storing of $T_{0,n}$ in memory which normally has shorter word length than that of the accumulator and that due to the storing of $Y_n$ in the output register. This is the least possible introduction of round-off noise. There is also a savings in the number of computations required for computational overhead, since intermediate accumulator contents need never be stored and retrieved. The multiplier-accumulator is seen to be utilized in every operation and therefore at maximum efficiency.

THE FIG. 3 SIDO 74 REALIZED BY THE PARALLEL CONNECTION OF r SMALLER, COMPONENT SIDO'S

It is sometimes desirable to realize a digital filter as an interconnection of smaller filters. A known method is the parallel connection which is obtained by expanding the desired transfer function into partial fractions. This approach has been disclosed for the particular case of digital filters employed in polyphase networks in the second-cited P. Vary publication cited above. The parallel realization can be used, in particular, for the SIDO networks introduced here. A factorization of $B(-z^M)$ into r factors, usually linear or quadratic in the vriable $z^{-M}$, such that $$B(-z^M) = B_1(-z^M) B_2(-z^M) \ldots B_r(-z^M) \tag{11}$$

is assumed. Using the conventional approach, as described for example in the P. Vary publication, the Equation (10) is written for $P_n(-z^M)$ and $P_m(-z^M)$ with m=2N−n, $$P_n(-z^M) = \frac{A_{n1}(-z^M)}{B_1(-z^M)} + \frac{A_{n2}(-z^M)}{B_2(-z^M)} + \ldots + \frac{A_{nr}(-z^M)}{B_r(-z^M)}, \tag{12}$$

and $$P_m(-z^M) = \frac{A_{m1}(-z^M)}{B_1(-z^M)} + \frac{A_{m2}(-z^M)}{B_2(-z^M)} + \ldots + \frac{A_{mr}(-z^M)}{B_r(-z^M)}. \tag{13}$$

The same factorization as in Equation (11) of $B(-z^M)$ must be employed for both $P_n(-z^M)$ and $P_m(-z^M)$, as is shown in Equations (12) and (13) used for designing SIDO n. The component SIDO's, denoted $S_1, S_2, \ldots, S_r$, are each obtained by employing like terms in (12) and (13), for example, output $U_i$ of $S_i$ (where "i" is a variable integer between 1 and r) is determined by $$U_i = \frac{A_{ni}(-z^M)}{B_i(-z^M)} W_n \quad (14)$$

and output $V_i$ of $S_i$ by $$V_i = \frac{-A_{mi}(-z^M)z^{-N}}{B_i(-z^M)} W_n \quad (15)$$

The factor $Z^{-N}$ in the above equation (15) corresponds to the delay of the delay register 34 in FIG. 3 and so must be considered in the definition of $V_i$ in the equation (15).

Since the denominators are the same and the numerators are each of lower degree in the variable $z^{-M}$ than the denominator, a well-known property of partial fraction expansions, $S_i$ has the same structure as the SIDO in FIG. 2. The integer L in FIG. 2 will be replaced by the degree of $B_i(-z^M)$, which will usually be 1 or 2. The parallel connection of the r filters, $S_1$ to $S_r$, yields the realization for SIDO filter 74 shown in FIG. 3.

The realization in FIG. 3 has the previously mentioned advantage of requiring fewer bits to represent the multiplier coefficients. However, the structure in FIG. 3 will require the accumulator to be cleared $r-1$ times while computing the $U_i$ for each of the first $r-1$ SIDO's, since these are independent functions described by the independent terms of Equation (12). The $r^{th}$ SIDO's output $U_r$ may then be computed, accumulated with the previously computed $r-1$ $U_i$ to yield $Y_{n,n}$, and then with all the $V_i$ of SIDO N−n to yield $Y_n$ without further clearing of the accumulator. Therefore, the coefficient accuracy advantage of the realization in FIG. 3 is offset by the disadvantage of additional round-off noise. However, the value of r can be varied to obtain the best balance between coefficient accuracy and round-off noise. It should be noticed that the least value of the number of factors of $B(z^{-M})$ is 1, which corresponds to the SIDO of FIG. 2, and that the maximum is normally the smallest integer greater than L/2 for conventional filtering functions. Therefore, the use of the structure in FIG. 3 gives added flexibility in balancing the effects of coefficient quantization and round-off noise in designing filter banks.

What is claimed is:

1. A digital filter bank of the type including a discrete transform means connected to a polyphase network comprising at least one complementary pair of first and second digital filters, characterized in that each of said filters comprises:
    a single input which provides a filter input signal during the course of a present sampling period;
    at least a first output which during the present sampling period gives a first output signal value independent of the present sampling period filter input singal and dependent on the filter input signal of a previous sample period;
    a second output which during the present sampling period gives an output signal value dependent in general on the value of the present filter input signal and
    a shift register which for the present sampling period receives a register input signal dependent on the present filter input signal, said shift register including a first set of stages comprising a first stage and every other one of a plurality of successive stages and including a second set of stages comprising a second stage and every other one of said plurality of successive stages, said first filter output being accumulated from weighted values of said first set of stages and said second filter output being accumulated from the weighted value of said register input signal and weighted values of said second set of stages.

2. The filter bank according to claim 1, wherein said first stage receives said register input signal, said second stage receives a signal from said first stage delayed by one sampling period and said second set of stages are connected as active elements in feedback for said sampling period.

3. The filter bank according to claim 2,
    said second filter also having a single filter input and at least first and second outputs, the second filter first output being independent of the second filter present input and dependent on the second filter input of a previous sampling period, said second filter second output being dependent in general upon the second filter present input,
    said filter bank further comprising means for accumulating in each sampling period the value of said first filter first output and the value of said second filter second output and for accumulating the value of said first filter second output and said second filter first output.

4. The filter bank according to claim 3 and comprising a plurality of complementary pairs of said first and second filters in said polyphase network.

5. The filter bank according to claim 4 wherein at least one of said first and second digital filters comprises:
    a parallel network of component digital filters each having a single input and first and second outputs, and
    means for accumulating all the first outputs of said component digital filters to generate a first output of said digital filter and for accumulating all the second outputs of said component digital filters to generate a second output of said digital filter.

* * * * *